(12) United States Patent
Lappalainen

(10) Patent No.: US 8,381,324 B2
(45) Date of Patent: Feb. 26, 2013

(54) VACUUM SEWAGE SYSTEM

(75) Inventor: Vesa Lappalainen, Vantaa (FI)

(73) Assignee: Evac International Oy, Espoo (FI)

( * ) Notice: Subject to any disclaimer, the term of this patent is extended or adjusted under 35 U.S.C. 154(b) by 551 days.

(21) Appl. No.: 12/519,195

(22) PCT Filed: Dec. 17, 2007

(86) PCT No.: PCT/FI2007/050697
§ 371 (c)(1),
(2), (4) Date: Sep. 8, 2009

(87) PCT Pub. No.: WO2008/074915
PCT Pub. Date: Jun. 26, 2008

(65) Prior Publication Data
US 2010/0031432 A1    Feb. 11, 2010

(30) Foreign Application Priority Data

Dec. 21, 2006    (FI) ..................................... 20065842

(51) Int. Cl.
*E03D 11/00*    (2006.01)
(52) U.S. Cl. .............................................. 4/431; 4/300
(58) Field of Classification Search .............. 4/431, 432, 4/433, 300; 137/205
See application file for complete search history.

(56) References Cited

U.S. PATENT DOCUMENTS

| 4,034,421 | A | * | 7/1977 | Pihl et al. ................. 137/565.22 |
| 4,184,506 | A | * | 1/1980 | Varis et al. .................... 137/205 |
| 4,246,925 | A | * | 1/1981 | Oldfelt ......................... 137/205 |
| 5,369,811 | A | | 12/1994 | Serre |
| 5,487,646 | A | * | 1/1996 | Ushitora et al. .................. 417/4 |
| 6,470,925 | B2 | * | 10/2002 | Hyvarinen et al. ............. 141/65 |

FOREIGN PATENT DOCUMENTS

| EP | 0287350 | 10/1988 |
| EP | 0330490 | 8/1989 |
| EP | 0333045 | 9/1989 |

(Continued)

OTHER PUBLICATIONS

Office Action dated Oct. 14, 2011 in corresponding Russian Patent Application No. 2009128052.

(Continued)

*Primary Examiner* — Gregory Huson
*Assistant Examiner* — Christine Skubinna
(74) *Attorney, Agent, or Firm* — Dean W. Russell; Kristin M. Crall; Kilpatrick Townsend & Stockton LLP

(57) ABSTRACT

The invention relates to a vacuum sewage system, which includes a sanitary unit, such as a toilet unit, vacuum sewer piping (200) connected to the sanitary unit, a discharge valve between the sanitary unit and the vacuum sewer piping, and a vacuum generating device for generating vacuum in the vacuum sewer piping. The system comprises an on-line separator device (1) in the vacuum sewer piping (200, 201) and a first pump means (2) and a second pump means (3) connected in parallel with the on-line separator device (1). The first pump means (2) is a vacuum pump for generating vacuum in the vacuum sewer piping (200, 201) and for evacuating air from the sewage flow flowing into the on-line separator device (1) and the second pump means (3) is arranged for pumping mainly sewage from the sewage flow flowing into the on-line separator device (1).

15 Claims, 3 Drawing Sheets

FOREIGN PATENT DOCUMENTS

| | | |
|---|---|---|
| EP | 0454794 | 11/1991 |
| EP | 0555984 | 8/1993 |
| EP | 0644299 | 3/1995 |
| EP | 0653524 | 5/1995 |
| EP | 0887478 | 12/1998 |
| EP | 1035261 | 9/2000 |
| EP | 1172492 | 1/2002 |
| JP | 5331891 | 12/1993 |
| JP | 5270404 A | 10/1995 |
| JP | 2002227281 A | 8/2002 |
| RU | 1820037 | 6/1993 |
| RU | 1826635 | 12/1994 |
| RU | 2250168 | 4/2005 |
| SU | 1043357 | 9/1983 |

OTHER PUBLICATIONS

FI20065842 Search Report issued by National Board of Patents and Registration of Finland on Aug. 24, 2007 with English translation.

Office Action dated Mar. 30, 2012 in Australian Patent Application No. 2007336150.

Office Action dated May 11, 2012 in Japanese Patent Application No. 2009-542115.

English Translation of Office Action dated May 11, 2012 in Japanese Patent Application No. 2009-542115.

\* cited by examiner

VACUUM SEWAGE SYSTEM

CROSS REFERENCE TO RELATED APPLICATIONS

This application is the U.S. national phase of International Application No. PCT/FI2007/050697 filed on Dec. 17, 2007 and published in English on Jun. 26, 2008 as International Publication No. WO 2008/074915 A1, which application claims priority to Finnish Patent Application No. 20065842 filed on Dec. 21, 2006, the entire contents of both of which are incorporated herein in their entireties by reference.

TECHNICAL FIELD

The invention relates to a vacuum sewage system, which comprises a sanitary unit, such as a toilet unit, vacuum sewer piping connected to the sanitary unit, a discharge valve between the sanitary unit and the vacuum sewer piping, and a vacuum generating device for generating vacuum in the vacuum sewer piping. The invention also relates to a method for operating a vacuum sewage system.

BACKGROUND ART

Vacuum sewage systems, particularly vacuum toilet systems, are well known. At a first stage of development a vacuum sewage system typically comprised a large volume collecting tank, in which system the tank is maintained under vacuum in order to provide vacuum for the vacuum sewer piping. Vacuum is maintained in the large volume collecting tank by a separate vacuum pump. The sewage is emptied from the collecting tank by a sewage pump connected to the bottom of the collecting tank. Due to the large volume collecting tank, such systems require a lot of space, which normally is not available in e.g. trains, marine vessels and aircraft. An example of such a solution is disclosed e.g. in EP 0 330 490.

At a later stage, an ejector based system came along, in which sewage is circulated from a large volume collecting tank to a liquid jet pump opening into the same collecting tank. The liquid jet pump has an inlet connected to vacuum sewer piping and further to sanitary units, such as toilets. The sewage is circulated through the liquid jet pump, whereby the liquid jet pump generates a vacuum towards the vacuum sewer piping for drawing sewage from the toilets into the collecting tank. This solution requires a lot of space. Further, it has a low degree of efficiency. Such a solution is known e.g. from EP 0 653 524.

Other developments include a liquid ring pump that is connected to a large volume collecting tank, whereby vacuum is generated and sewage is pumped by the same pump in an alternating manner, e.g. EP 0 287 350.

Another single pump solution is disclosed in EP 0 644 299. This solution comprises a moisture protected dry rotary vane pump, which generates vacuum in a large volume collecting tank. This tank is emptied by reversing the pump function, so that the pressure side of the pump is connected to the large volume collecting tank for emptying the same by forcing out the sewage to another location by pressurized air. This solution also requires a large space and furthermore the pump is very vulnerable to any humidity, thus requiring intricate control mechanisms.

On-line systems provided with liquid ring pumps generating vacuum and pumping sewage directly from the vacuum sewer piping are also known and are disclosed e.g. in EP 0 333 045 and EP 0 454 794. A further on-line solution is described e.g. in EP 1 172 492. Such on-line systems deploy one single pump which generates vacuum and sucks sewage at the same time. These solutions represent attempts to reduce space requirement by eliminating the intermediate large volume collecting tank, i.e. a tank located between the pump and the vacuum sewer piping, The latter solutions with on-line pumps having the dual duty of generating vacuum by sucking air and simultaneously sucking sewage are, however, not very efficient. Further, they are apt to functional disturbances. The pumps used in this context are designed either for pumping air or pumping liquid, whereby the transport of both air and liquid generally is not very successful.

This is due to the typical transport function of a vacuum sewage system, particularly a vacuum toilet system, where sewage is transported through the vacuum sewer piping in slugs with intermediate large volumes of air forming a non-homogenous sewage flow.

When a vacuum toilet is flushed by activating the flush function, the discharge valve between the vacuum toilet bowl and the vacuum sewer piping is opened, and the vacuum prevailing in the vacuum sewer piping draws out the sewage and flush water from the toilet into the vacuum sewer piping. Only a small amount of flush water is needed, due to the strong suction effect of the vacuum sewer piping and the atmospheric pressure prevailing in (and around) the vacuum toilet bowl. The amount of sewage and flush water is typically about 2 liters.

Consequently, there is a pressure difference, i.e. atmospheric pressure on the toilet bowl side of the sewage and flush water and vacuum on the vacuum sewer piping side of the sewage and flush water, when the discharge valve opens. The transport of sewage and flush water takes place due to this pressure difference, whereby the sewage and flush water forms a discrete slug followed by a large amount of air, e.g. about 2 liters of sewage and flush water followed by about 60 liters of air, i.e. a sewage and flush water in a ratio of about 1:30 to air. A large amount of air is sucked or forced into the vacuum sewer piping since the discharge valve remains open for a certain period of time.

Vacuum sewer piping generally is of a relatively small diameter which helps to keep up the formation of the slugs, which again is necessary for maintaining the pressure difference (lower pressure in front and higher pressure behind the discrete slugs) necessary for transport. During the transport through the vacuum sewer piping, the slugs are affected by gravity and flatten out after some time in horizontally arranged piping. This equalizes the pressure, whereby the necessary pressure difference described above before and after the discrete slugs is abolished. In order to re-establish the pressure difference for sewage transport, the vacuum sewer piping is provided with low points or pockets, in which the sewage collects so that the discrete slugs are formed again.

Such a train of discrete slugs and air, especially in a ratio of about 1:30, which forms the sewage flow in a vacuum sewage system, is difficult to pump with high efficiency.

SUMMARY OF THE INVENTION

An object of the present invention is to provide a vacuum sewer system, which avoids the above mentioned problems and provides an effective sewage transport with a pump arrangement that reduces space requirement. These objects are attained by a vacuum sewage system and by a method for operating a vacuum sewage system as described and claimed herein.

The basic idea of the invention is to remain within an on-line solution, thus avoiding any intermediate large volume collecting tanks, and to remove sewage (with flush water) and air in the same proportion (ratio about 1:30) as they appear or are present in a vacuum sewage system as described above.

The vacuum sewage system comprises an on-line separator device in the vacuum sewer piping, and a first pump means and a second pump means connected in parallel to the on-line separator device. The first pump means is a vacuum pump for generating vacuum in the vacuum sewer piping and for evacuating air from the sewage flow flowing into the on-line separator device from the vacuum sewer piping and the second pump means is arranged for pumping mainly sewage from the sewage flow flowing into the online separator device from the vacuum sewer piping.

This combination of two pump means of different types allows for efficiently pumping the non-homogenous sewage flow transported in the vacuum sewer piping. The parallel coupling of the pump means require that the separation has to be effectively carried out within a small space, i.e. within the on-line separator device. Separation is generally continuous, since sewage is not collected in the on-line separator device. The on-line separator device is arranged to separate air from sewage in the on-line separator device.

Advantageously, a first valve means is arranged on the suction side of the vacuum pump, between the vacuum pump and the on-line separator device. This is mainly to ensure that the vacuum pump does not pump liquid.

The on-line separator device is advantageously provided with a surface level indicator, which is used for controlling the operation of the first valve means mentioned above. This further helps to ensure that the vacuum pump does not pump liquid. In addition, the surface level indicator can be used to monitor the operation of the second pump means, particularly so that sewage is not accumulated in the on-line separator.

When the sewage flow, containing sewage and flush water as well as air, flows into the on-line separator device, it is advantageous to ensure that the liquid part flows toward the second pump means and that the air is naturally raised towards the vacuum pump. This is achieved by having an outlet of the vacuum sewer piping opening into the on-line separator device directed towards the second pump means.

The second pump means comprises a liquid pump. For efficient operation of the vacuum sewage system, the pump should also be able to pump air at least to a limited extent. Consequently, the definition liquid pump in this specific context has to be understood as defining a pump that mainly pumps liquid, and also has the capacity to pump air at least to a limited extent. The phrase "the second pump means is arranged for pumping mainly sewage" is intended to define that the second pump means should be able also to pump some air. In other words, it could be classified as a vacuum pump that can pump liquids as well. This second pump has to have the capacity to pump also from a source in a state of vacuum or under pressure. The liquid pump in this context could be a self-priming pump, a rotary lobe pump, a liquid ring pump, or the like.

To provide for retro-fit installations in already existing vacuum sewage systems, the second pump means may include a liquid jet pump and a liquid pump connected to a circulation tank, whereby liquid collected in the circulation tank is circulated by the liquid pump to the liquid jet pump in order to produce a suction effect for pumping mainly sewage from the sewage flow flowing into the on-line separator device and further pumping said sewage into the circulation tank. In this way the advantages of the present invention may be achieved also in systems already in use.

The vacuum sewage system advantageously comprises a pressure gauge connected to the vacuum sewer piping which may be used for controlling the operation of the two pumps coupled in parallel to the on-line separator device.

The first pump means and the second pump means are consequently operated so that there a continuous or a more or less continuous separation of the sewage flow is provided by the on-line separator device. Sewage is not collected in the on-line separator device and the continuity depends on the level of usage of the vacuum sewage system.

The method according to the invention for operating a vacuum sewage system employs an on-line separator device in the vacuum sewer piping, whereby a sewage flow is transported through the vacuum sewer piping. The on-line separator device separates air from sewage from the sewage flow flowing into the on-line separator device from the vacuum sewer piping.

A first pump means in the form of a vacuum pump generates vacuum in the vacuum sewer piping and evacuates air from the sewage flow flowing into the on-line separator device from the vacuum sewer piping, and a second pump means is parallel coupled with the first pump means to the on-line separator device and pumps mainly sewage from the sewage flow flowing into the on-line separator device from the vacuum sewer piping. This provides for using each pump for pumping a medium for which it is designed. The on-line separator separates air from sewage in the on-line separator.

The method further employs a first valve means on the suction side of the vacuum pump, between the vacuum pump and the on-line separator device. By appropriate timing of the operation, the second pump means may then be used to efficiently pump the sewage and flush water and the vacuum pump may be operated so that it generates vacuum or evacuates air when necessary. The first valve means is employed as an advantageous safety measure in order to ensure that sewage and flush water does not flow into the vacuum pump.

Advantageous embodiments of the method for operating the vacuum sewage system are given in the accompanying claims.

BRIEF DESCRIPTION OF DRAWINGS

In the following the invention will be described, by way of example only, with the reference to the accompanying schematic drawings, in which.

DETAILED DESCRIPTION

Figure 1:
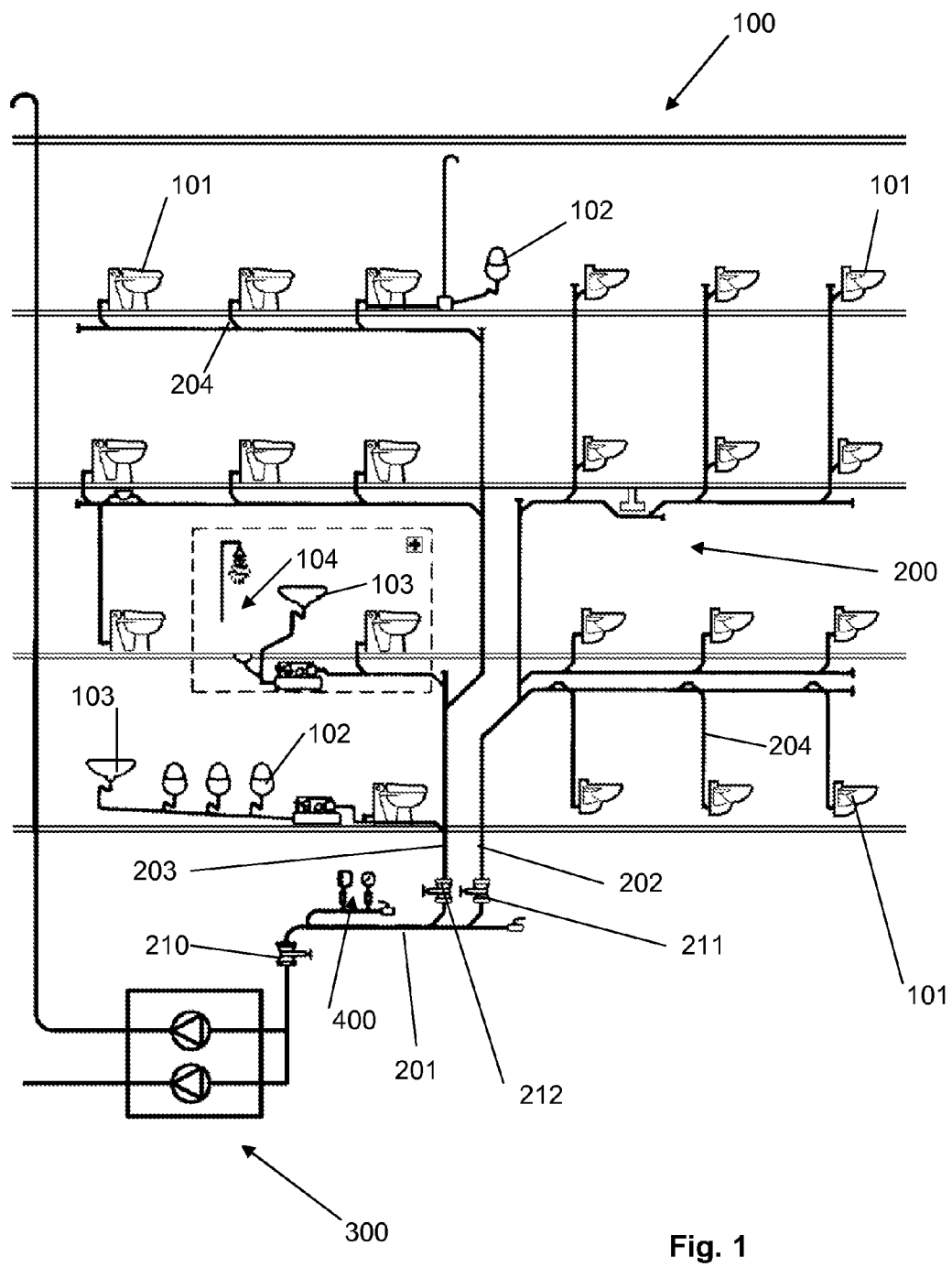
FIG. 1 illustrates an example of a general lay-out of a vacuum sewage system.

The invention relates to a vacuum sewage system 100, an example of which is schematically illustrated in FIG. 1. The vacuum sewage system 100 includes a sanitary unit, such as a toilet unit 101, and vacuum sewer piping 200 connected to the sanitary unit. The vacuum sewer piping 200, as illustrated in this figure, includes a collector 201, a first main pipe 202 and a second main pipe 203, as well as branch pipes 204 connecting to each of the sanitary units.

The sanitary unit can also be e.g. a urinal 102, a washbasin 103, a shower unit 104, etc. Each sanitary unit is connected to the vacuum sewer piping, or as illustrated to the branch pipes 204, by means of a discharge valve (not shown). The vacuum sewage system further includes a vacuum generating device 300 for generating vacuum in the vacuum sewer piping 200.

In this connection the vacuum generating device is to be understood only as a generalisation. In the vacuum sewage system the sewage is collected from the sanitary units, transported through the vacuum sewer piping by means of the vacuum generated by the vacuum generating device 300, and then transported through the vacuum generating device to e.g. a gravity sewer or to some other space, where the discharged sewage is collected. This is not shown in the drawings.

The first main pipe 202 is connected to the collector 201 through a first shutoff valve 211 and the second main pipe 203 is connected to the collector 201 through a second shut-off valve 212. The collector 201 is connected to the vacuum generating device 300 through a third shut-off valve 210. The collector 201 is provided with a pressure gauge 400.

Basically the vacuum sewage system operates in the following manner.

The vacuum generating device 300 generates a vacuum in the vacuum sewer piping 200, usually to a (high) vacuum level of e.g. up to about 0.5 bar, after which the vacuum generating device may be stopped. When e.g. a toilet unit 101 is flushed, the discharge valve (not shown) between the toilet unit 101 and the branch pipe 204 is opened, whereby the sewage and flush water is forced into the vacuum sewer piping 200, in this case a branch pipe 204, followed by a large volume of air due to the pressure difference between the vacuum in the vacuum sewer piping and the atmospheric pressure prevailing in and around the toilet unit 101. The sewage and flush water takes the form of a discrete slug, whereby the transport of the discrete slug takes place based on said pressure difference, lower pressure in front of the discrete slug and higher pressure behind the discrete slug. This has been described in more detail above.

After the sanitary units have been used to some extent, e.g. the toilet unit 101 have been flushed, the washbasin 103 or the shower unit 104 has been used, the vacuum level in the vacuum sewer piping 200 is lowered. When it reaches a predetermined (low) level, e.g. about 0.35 bar, the vacuum generating device 300 is started in order to re-establish or regenerate the vacuum to a predetermined (high) level, e.g. about 0.5 bar as mentioned above. The pressure level in the vacuum sewer piping 200 is monitored by the pressure gauge 400, which may be used to activate or deactivate the vacuum generating device.

Such vacuum sewage systems are well known in the art and are not described more in detail in this connection.

The pressure levels given above are only given as illustrative examples.

In the present invention, the vacuum sewage system further includes an online separator device 1 (FIG. 2 and FIG. 3) in the vacuum sewer piping 200, to which on-line separator device a first pump means 2 and a second pump means 3 are connected in parallel. The two pump means are indicated only schematically in FIG. 1.

Figure 2:
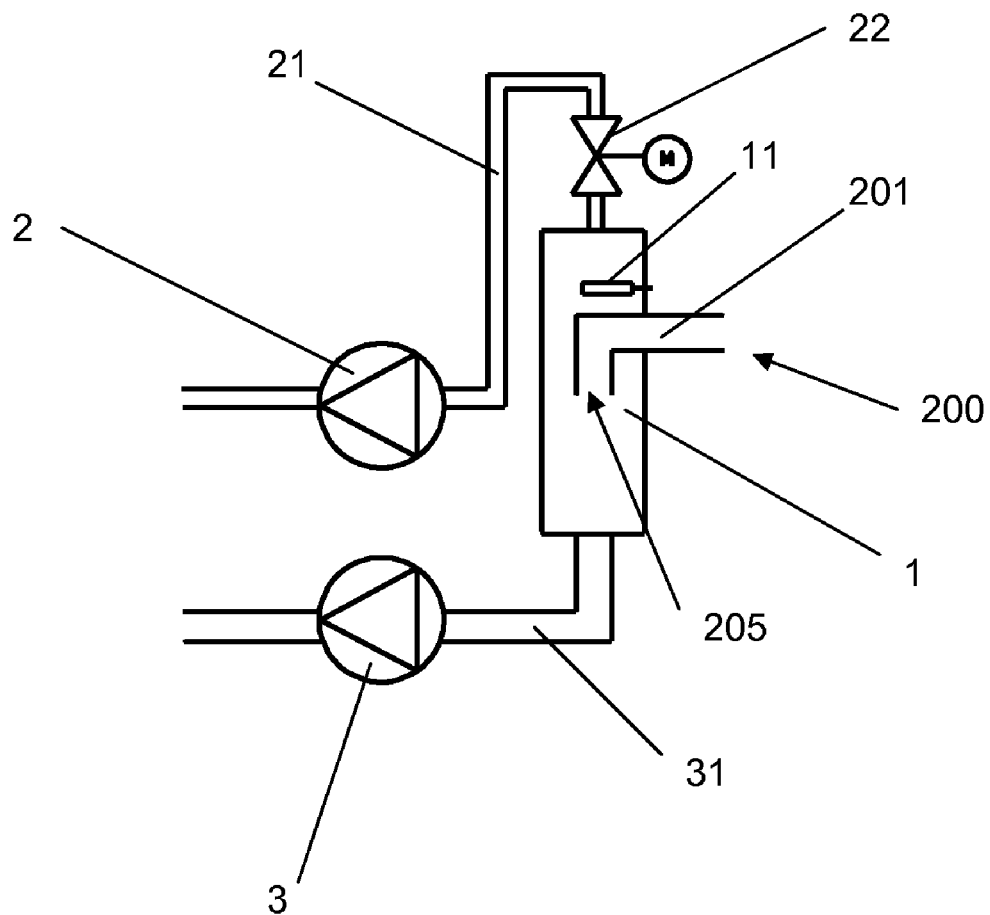
FIG. 2 illustrates a first embodiment of an on-line separator with two pump means coupled in parallel.

FIG. 2 shows a first embodiment of the on-line separator device 1 with two pump means coupled in parallel to the on-line separator device 1. The first pump means 2 is a vacuum pump connected to the on-line separator device 1 by means of a conduit 21 provided with a first valve means 22, a shut-off valve, which is arranged on the suction side of the vacuum pump, between the vacuum pump and the on-line separator device 1. This first valve means 22 is not necessary for the appropriate functioning of the arrangement, but advantageous as a safety feature. The second pump means 3 is a liquid pump, which also should have the capacity to pump air, the suction side of which is connected to the on-line separator device 1 by means of a conduit 31. The two pump means are defined and discussed in more detail above.

The on-line separator device 1 is arranged in the vacuum sewer piping 200. With particular reference to FIG. 1, it is arranged in connection with the collector 201, whereby the sewage flow in the form of a train of discrete slugs followed by large volumes of air (as described above) flows into the on-line separator device 1 during the transport of sewage in the vacuum sewage system. The vacuum sewer piping 200, or in this case the collector 201, has an outlet 205 opening into the on-line separator device 1. The outlet 205 is preferably directed towards the second pump means 3, in particular towards the conduit 31 connecting the second pump means 3 to the on-line separator device 1. This helps to avoid that liquid or moisture is directly conveyed towards the first pump means 2.

The on-line separator device 1 is provided with a surface level indicator 11 for monitoring the sewage level in the on-line separator device 1 in order to avoid that sewage accumulates in the on-line separator device.

In the following, the operation of the vacuum sewage system employing the on-line separator device with the two pump means coupled in parallel with the same will be described, with reference to the embodiment of FIG. 2.

When a desired vacuum level, e.g. a given high level of e.g. about 0.5 bar as discussed above, is to be generated in the vacuum sewer piping 200, the second pump means 3 is firstly started in order to ensure that it pumps out any sewage and flush water possibly present in the on-line separator device 1 through the conduit 31. After an adjustable delay, e.g. after about a couple of seconds, the first valve means 22 is opened, whereby the vacuum pump is started in order to generate the desired vacuum in the vacuum sewer piping 200. The vacuum level is monitored by the pressure gauge 400, and when the desired vacuum (high) level has been reached, the first valve means 22 is closed. The first pump means 2 may then be stopped at the same time or after an adjustable delay, e.g. about 15 seconds. This depends on the usage of the vacuum sewage system. If it is expected that the vacuum level may decrease within a short time due to high usage, the first pump means 2 can be kept running in order to avoid frequent restarting of the first pump means 2. The second pump means 3 continues to operate for a while to remove any sewage and flush water that possibly remains in the on-line separator device 1. The on-line separator device 1 is not intended for collecting or accumulating sewage. For an efficient operation of the vacuum sewage system, the first pump means 2 is not run, if the second pump means 3 is not running.

When the vacuum sewage system is used, e.g. by flushing a toilet unit 101, using a urinal 102, washbasin 103, or shower unit 104, the pressure drops in the vacuum sewer piping 200. When the vacuum level reaches a predetermined low level, e.g. about 0.35 bar as discussed above, the desired vacuum level needs to be re-established in order to ensure the transport function of the vacuum sewage system.

If this happens within the time the vacuum pump is still running, e.g. within the adjustable delay of about 15 seconds as mentioned above, the second pump means 3 is firstly started and run for a short period, after which the first valve means 22 is opened in order for vacuum pump to be able to regenerate the desired vacuum level in the vacuum sewer piping 200.

If the vacuum level in the vacuum sewer piping reaches the given low level after the vacuum pump has stopped, the second pump means 3 is firstly started and run for a while, after which the first valve 22 is opened and the vacuum pump is started after an adjustable delay in order to raise the vacuum level in the vacuum sewer piping 200 to the given high level, i.e. the desired level.

The principle function of the on-line separator device 1 is to continuously separate the sewage and flush water from the air in the sewage flow flowing into the on-line separator device 1 from the sewer piping 200. In this way each of the two pumps can be effectively used to pump a medium that they are specifically designed to pump.

The second pump means 3 pumps sewage and flush water from the sewage flow, and the first pump means 2, the vacuum pump, sucks air from the sewer piping 200, partly in order to generate vacuum and partly to evacuate air from the sewage flow. The first pump means 2 and the second pump means 3 are consequently operated so that there a continuous or a more or less continuous separation of the sewage flow is provided by the on-line separator device 1. Sewage is not collected in the on-line separator device 1 and the continuity depends on the level of usage of the vacuum sewage system.

The purpose of the first valve means 22 is to avoid liquid from entering the vacuum pump. The on-line separator device 1 is also provided with a surface level indicator 11 that monitors the level of sewage and flush water in the on-line separator device 11. The second pump means 3 is always started when the surface level indicator 11 indicates a given sewage level in the on-line separator device 1. Also, the first pump means 2 is not started when said given sewage level is indicated. The surface level indicator 11 is also advantageously connected to the first valve means 22, e.g. a motor valve, for controlling the operation of the same. This further ensures that the appropriate pump only pumps the medium it is designed for. An additional measure for this purpose is to arrange that the outlet 205 of the vacuum sewer piping 200, or the collector 201, opening into the on-line separator 1, is directed towards the second pump means 3.

The sewage vacuum system functions appropriately even without the first valve means 22 due to efficient separation of the air from the sewage and flush water in the on-line separator device. The first valve means is used mainly as a safety measure. The control of the vacuum and sewage flow in the vacuum sewer piping may be carried out by the first, second and third shut-off valves 211, 212 and 210.

The air sucked by the vacuum pump may be somewhat humid, whereby it is advantageous to connect a condensate removing arrangement through a valve means to the pressure side of the vacuum pump, in order to remove any condensate that is formed.

The second pump means 3 may advantageously be provided with a heat sensor in order to avoid overheating. The pump means is then stopped when the temperature is too high, e.g. in the event of dry-running.

The basic idea of the invention is to remain within an on-line system. Consequently, the sewage collected from the sanitary units is transported through the vacuum sewer piping 200 and the on-line separator device 1 and by the second pump means 3 further to e.g. a gravity sewer or to some other space, where the discharged sewage is collected. This is not shown in the drawings.

The pressure levels and the times given above are only given as illustrative examples.

Figure 3:
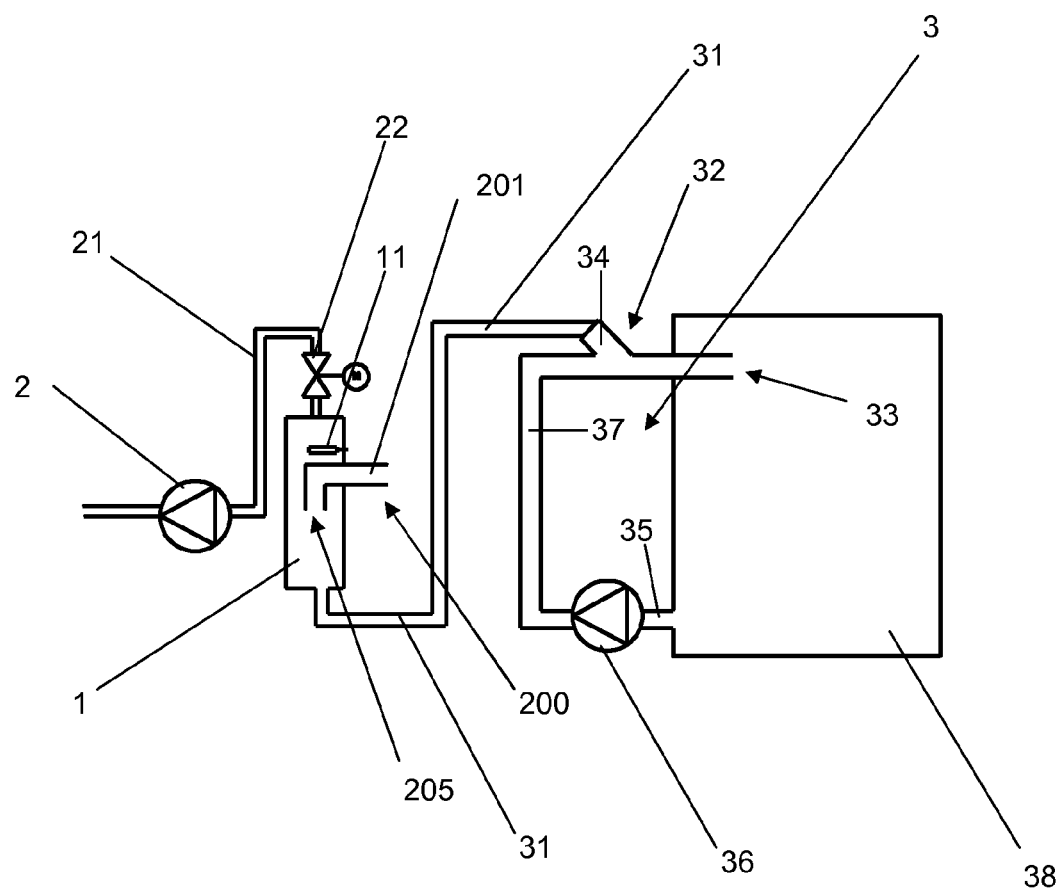
FIG. 3 illustrates a second embodiment of an on-line separator with two pump means coupled in parallel.

FIG. 3 shows a second embodiment of the on-line separator device 1 with two pump means coupled in parallel to the on-line separator device 1. The first pump means 2 is a vacuum pump connected to the on-line separator device 1 by means of a conduit 21 provided with a first valve means 22, a shut-off valve, which is arranged on the suction side of the vacuum pump, between the vacuum pump and the on-line separator device 1. The second pump means 3 is connected to the on-line separator device 1 by means of a conduit 31. The second pump means 3 comprises a liquid jet pump 32 and a liquid pump 36 connected to a circulation tank 38. The liquid collected in the circulation tank 38 is circulated by the liquid pump 36 to the liquid jet pump 32 in order to produce a suction effect in the conduit 31 for pumping mainly sewage from the sewage flow flowing into the on-line separator device 1 and further into the circulation tank 38. The second pump means 3 corresponds to an ejector system. The two pump means are defined and discussed in more detail above.

The on-line separator device 1 is arranged in the vacuum sewer piping 200. With particular reference to FIG. 1, it is arranged in the collector 201, whereby the sewage flow in the form of a train of discrete slugs followed by large volumes of air (as described above) flows into the on-line separator device 1 during the transport of sewage in the vacuum sewage system. The vacuum sewer piping 200, or in this case the collector 201, has an outlet 205 opening into the on-line separator device 1. The outlet 205 is directed towards the second pump means 3, in particular towards the conduit 31 connecting the second pump means 3 to the on-line separator device 1. This helps to avoid that liquid or moisture is directly conveyed towards the first pump means 2.

The on-line separator device 1 is provided with a surface level indicator 11 for monitoring the sewage level in the on-line separator device 1 in order to avoid that sewage accumulates in the on-line separator device.

In the following, the operation of the vacuum sewage system employing the on-line separator device with the two pump means coupled in parallel to the same will be described, with reference to the embodiment of FIG. 3.

When a desired vacuum level, e.g. a given high level of e.g. about 0.5 bar as discussed above, is to be generated in the vacuum sewer piping 200, the second pump means 3 is firstly started in order to ensure that it pumps out any sewage and flush water possibly present in the on-line separator device 1 through the conduit 31. After an adjustable delay, e.g. after about a couple of seconds, the first valve means 22 is opened, whereby the vacuum pump is started in order to generate the desired vacuum in the vacuum sewer piping 200. The vacuum level is monitored by the pressure gauge 400, and when the desired vacuum (high) level has been reached, the first valve means 22 is closed. The first pump means 2 may then be stopped at the same time or after and adjustable delay, e.g. about 15 seconds. This depends on the usage of the vacuum sewage system. If it is expected that the vacuum level may decrease within a short time due to high usage, the first pump means 2 can be kept running in order to avoid frequent restarting of the first pump means 2. The second pump means 3 continues to operate for a while to remove any sewage and flush water that possibly remains in the on-line separator device 1. The on-line separator device 1 is not intended for collecting or accumulating sewage. For an efficient operation of the vacuum sewage system, the first pump means 2 is not run, if the second pump means 3 is not running.

The operation of the second pump means 3 in this embodiment is as follows. Initially a certain level of liquid is needed in the circulation tank 38, so that the liquid pump 36 can function properly. When the second pump means 3 has to be activated, the liquid pump 36 is started, whereby it pumps liquid from the circulation container by way of the conduit 35. This liquid is then pumped into the liquid jet pump 32 and out of the ejector 33 into the circulation tank 38. This creates a suction effect at the suction end 34 of the liquid jet pump 32, and further to the conduit 31, which then pumps the sewage and flush water from the on-line separator device 1.

The present invention can thus be applied as a retro-fit to already existing, prior art vacuum sewage systems, in a very simple and effective manner.

Consequently, as described in connection with FIG. 2 above, when the vacuum sewage system is used, e.g. by flushing a toilet unit 101, using a urinal 102, washbasin 103, or shower unit 104, the pressure drops in the vacuum sewer piping 200. When the vacuum level reaches a predetermined low level, e.g. about 0.35 bar as discussed above, the desired vacuum level needs to be re-established in order to ensure the transport function of the vacuum sewage system.

If this happens within the time the vacuum pump is still running, e.g. within the adjustable delay of about 15 seconds as mentioned above, the second pump means 3, i.e. the liquid pump 36, is firstly started and run for a short period, after which the first valve means 22 is opened in order for vacuum pump to be able to regenerate the desired vacuum level in the vacuum sewer piping 200.

If the vacuum level in the vacuum sewer piping reaches the given low level after the vacuum pump has stopped, the liquid pump 36 is firstly started and run for a while, after which the first valve 22 is opened and the vacuum pump is started after an adjustable delay in order to raise the vacuum level in the vacuum sewer piping 200 to the given high level, i.e. the desired level.

The principle function of the on-line separator device 1 is to continuously separate the sewage and flush water from the air in the sewage flow flowing into the on-line separator device 1 from the sewer piping 200. In this way each of the two pumps can be effectively used to pump a medium that they are specifically designed to pump.

The second pump means 3, the liquid pump 36 together with the liquid jet pump 32 pump sewage and flush water from the sewage flow, and the first pump means 2, the vacuum pump, sucks air from the sewer piping 200, partly in order to generate vacuum and partly to evacuate air from the sewage flow flowing into the on-line separator device form the collector 201. The first pump means 2 and the second pump means 3 are consequently operated so that a continuous or more or less continuous separation of the sewage flow is provided by the on-line separator device 1. Sewage is not collected in the on-line separator device 1 and the continuity depends on the level of usage of the vacuum sewage system.

The purpose of the first valve means 22 is to avoid the any liquid enters the vacuum pump. The on-line separator device 1 is also provided with a surface level indicator 11 that monitors the level of sewage and flush water in the on-line separator device 11. The surface level indicator 11 is also advantageously connected to the first valve means 22, e.g. a motor valve, for controlling the operation of the same. The liquid pump 36 is always started when the surface level indicator 11 indicates a given sewage level in the on-line separator device 1. Also, the vacuum pump is not started when said given sewage level is indicated. This further ensures that the appropriate pump only pumps the medium it is designed for. An additional measure for this purpose is to arrange that the outlet 205 of the vacuum sewer piping 200, or the collector 201, opening into the on-line separator device 1, is directed towards the conduit 31 leading to the second pump means 3.

The sewage vacuum system functions appropriately even without the first valve means 22 due to efficient separation of the air from the sewage and flush water in the on-line separator device. The first valve means is used mainly as a safety measure. The control of the vacuum and sewage flow in the vacuum sewer piping may be carried out by the first, second and third shut-off valves 211, 212 and 210.

The air sucked by the vacuum pump may be somewhat humid, whereby it is advantageous to connect a condensate removing arrangement through a valve means to the pressure side of the vacuum pump, in order to remove any condensate that is formed.

The basic idea of the invention is to remain within an on-line system. Consequently, the sewage collected from the sanitary units is transported through the vacuum sewer piping 200 and the on-line separator device 1 and further by the second pump means 3 and from the circulation tank 38 to e.g. a gravity sewer or to some other space, where the discharged sewage is collected. This is not shown in the drawings.

The pressure levels and the times given above are only given as illustrative examples.

The description and drawings are only intended to clarify the basic idea of the invention. The invention may vary within the scope of the ensuing claims.

The invention claimed is:

1. Vacuum sewage system, which comprises a sanitary unit, such as a toilet unit, vacuum sewer piping connected to the sanitary unit, a discharge valve between the sanitary unit and the vacuum sewer piping, which discharge valve is arranged to be opened when the sanitary unit is used,
    a first pump for generating vacuum in the vacuum sewer piping,
    a second pump for pumping mainly sewage, and
    an on-line separator device in the vacuum sewer piping, wherein the on-line separator device separates air from sewage without collecting or storing sewage therein and has a vacuum level between a given high level and a predetermined low level,
    wherein the on-line separator device is connected in parallel between the first pump and the second pump such that the first pump is directly connected in parallel to the on-line separator device via a first conduit and the second pump is directly connected in parallel to the on-line separator device via a second conduit,
    wherein the first pump is arranged to evacuate air in order to generate a vacuum in the sewer piping and the second pump is arranged to pump mainly sewage from a sewage flow flowing into the on-line separator device with the vacuum level between the given high level and the predetermined low level and direct the sewage to a separate sewage collection area so that sewage is not collected or stored in the on-line separator.

2. Vacuum sewage system according to claim 1, wherein a first valve is arranged on the suction side of the first pump, between the first pump and the on-line separator device.

3. Vacuum sewage system according to claim 1, wherein the on-line separator device is provided with a surface level indicator.

4. Vacuum sewage system according to claim 1, wherein an outlet of the vacuum sewer piping opening into the on-line separator device is directed towards the second pump.

5. Vacuum sewage system according to claim 1, wherein the second pump comprises a liquid pump, a self-priming pump, a rotary lobe pump, or a liquid ring pump.

6. Vacuum sewage system according to claim 1, wherein the second pump comprises a liquid jet pump and a liquid pump connected to a circulation tank, whereby liquid collected in the circulation tank is circulated by the liquid pump to the liquid jet pump in order to produce a suction effect for pumping mainly sewage from the sewage flow flowing into the on-line separator device and further pumping said sewage into the circulation tank.

7. Method for operating a vacuum sewage system, which includes a sanitary unit, such as a toilet unit, vacuum sewer piping, a discharge valve between the sanitary unit and the vacuum sewer piping, whereby the discharge valve is opened when the sanitary unit is used, in which method a first pump is used to generate vacuum in the vacuum sewer piping and a second pump is used to pump mainly sewage, wherein the method employs an on-line separator device in the vacuum sewer piping, wherein the on-line separator device separates air from sewage without accumulating sewage therein, wherein the first pump and the second pump are connected in parallel directly to the on-line separator device which has a vacuum level between a given high level and a predetermined low level, the first pump evacuates air and the second pump pumps mainly sewage from a sewage flow flowing into the on-line separator device with the vacuum level between the given high level and the predetermined low level and directs the sewage to a separate sewage collection area so that sewage is not accumulated in the on-line separator, wherein said vacuum level in the vacuum sewer piping is monitored by a pressure gauge.

8. Method according to claim 7, wherein the method employs a first valve on the suction side of the first pump, between the first pump and the on-line separator device, in which method the second pump is started after the vacuum level in the vacuum sewer piping has reached the predetermined low level, the first valve is opened after an adjustable delay after the second pump has been started, the first pump is started after an adjustable delay after the first valve has been opened, and in that the first valve is closed after the vacuum level in the vacuum sewer piping has reached a given high level.

9. Method according to claim 8, wherein the first pump is stopped at the same time or after an adjustable delay after the first valve has been closed.

10. Method according to claim 8, wherein the second pump is stopped after an adjustable delay after the first pump has been stopped.

11. Method according to claim 9, wherein if the vacuum level in the vacuum sewer piping reaches the predetermined low level before the first pump has been stopped, the second pump is started and the first valve is opened after an adjustable delay.

12. Method according to claim 9, wherein if the vacuum level in the vacuum sewer piping reaches the predetermined low level after the first pump has been stopped, the second pump is started, the first valve is opened with an adjustable delay after the second pump has been started, and the first pump is started after an adjustable delay after the first valve has been opened in order to raise the vacuum level in the sewer piping to the given high level.

13. Method according to claim 7, wherein the method employs a surface level indicator in the on-line separator device, and in the second pump is started when the surface level indicator indicates a given sewage level in the on-line separator device.

14. Method according to claim 7, wherein the method employs a surface level indicator in the on-line separator device, and the first pump is not started when the surface level indicator indicates a given sewage level in the on-line separator device.

15. Vacuum sewage system according to claim 1, wherein the vacuum sewage system comprises a pressure gauge connected to the vacuum sewer piping for monitoring the vacuum level in the vacuum sewer piping.

* * * * *